United States Patent [19]

Kawakami et al.

[11] Patent Number: 4,712,143
[45] Date of Patent: Dec. 8, 1987

[54] APPARATUS FOR MONITORING A TIMEBASE COMPRESSED COLOR VIDEO SIGNAL

[75] Inventors: Hiroshi Kawakami, Tokyo; Kazuo Ishizaka, Kanagawa, both of Japan

[73] Assignee: Sony Corporation, Tokyo, Japan

[21] Appl. No.: 743,984

[22] Filed: Jun. 12, 1985

[30] Foreign Application Priority Data

Jun. 14, 1984 [JP] Japan ................................ 59-122701

[51] Int. Cl.⁴ ............................................. H04N 9/79
[52] U.S. Cl. ..................................... 358/311; 358/320
[58] Field of Search ................... 358/16, 40, 310, 320, 358/330, 334, 311

[56] References Cited

U.S. PATENT DOCUMENTS 4,467,368  8/1984  Horstmann ........................... 358/310
4,577,236  3/1986  Takanashi ............................. 358/320
4,608,609  8/1986  Takano et al. ....................... 358/320

Primary Examiner—Donald McElheny, Jr.
Attorney, Agent, or Firm—Lewis H. Eslinger; Alvin Sinderbrand

[57] ABSTRACT

An apparatus for recording a color video signal in which a luminance signal and a chrominance signal are recorded on separate channels and at least two chrominance component signals are compressed in timebase and alternately arranged in turn to be recorded on one track as the chrominance signal is disclosed. This apparatus includes timebase compressing and expanding circuits provided respectively for the chrominance component signals and for producing timebase compressed chrominance component signals by writing the chrominance component signals by a first signal and by reading them by a second signal with the frequency integer times as high as that of the first signal and a coupling circuit for simultaneously supplying the chrominance component signals, which are being read out from the output terminals of the timebase compressing and expanding circuits by the second signal, to the input terminals of the timebase compressing and expanding circuits, whereby the timebase compressed chrominance component signals are written in the timebase compressing and expanding circuits by the second signal. In this case, when succeeding chrominance component signals are written in the timebase compressing and expanding circuits by the first signal, the timebase compressed chrominance component signals rewritten in the timebase compressing and expanding circuits are read out therefrom by the first signal so as to produce normal chrominance component signals.

5 Claims, 39 Drawing Figures

APPARATUS FOR MONITORING A TIMEBASE COMPRESSED COLOR VIDEO SIGNAL

BACKGROUND OF THE INVENTION

1. Field of the Invention

This invention relates generally to an apparatus for recording a color video signal in which signals resulting from timebase-compressing and time division-multiplexing a pair of chrominance component signals are recorded on a track separate from that of a luminance signal at the same time when the luminance signal is recorded. More particularly but not exclusively, this invention relates to an apparatus for recording a color video signal from which a timebase compressor and expander for time division-multiplexing is removed.

2. Description of the Prior Art

For a recording apparatus such as a camera-in-one video tape recorder and other recording and reproducing apparatus (VTR), such a recording and reproducing system is proposed in which a color video signal is divided into a luminance signal and a pair of chrominance component signals and they are recorded on separate tracks (disclosed in published Japanese patent application unexamined NO. 134891/1981). In this previously proposed recording and reproducing system, a pair of chrominance component signals, for example, a pair of color difference signals $R-Y$ and $B-Y$ are compressed in timebase to one half ($\frac{1}{2}$), time division-multiplexed with each other as shown in FIG. 2B and then the compressed time division-multiplexed color signal (hereinafter referred to as a compressed color difference signal) is recorded on a track adjacent to the track on which the luminance signal Y is recorded.

Figure 1:
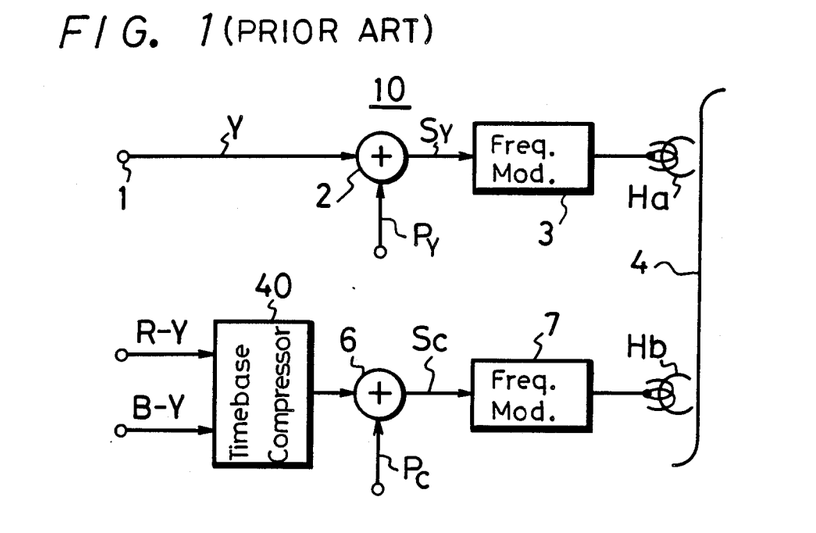
FIG. 1 is a schematic block diagram showing an example of a prior art recording apparatus.

FIG. 1 is a schematic block diagram showing a practical example of a prior art recording apparatus 10 which can realize such recording system.

Referring to FIG. 1, in the recording apparatus 10, a luminance signal Y containing a horizontal synchronizing pulse $P_H$ and applied to a terminal 1 is supplied to an adder 2 in which it is added with a first synchronizing signal (pulse) $P_Y$ which is used to match the timings between the channels. The synchronizing pulse $P_Y$ is added to the second half portion of, for example, a horizontal synchronizing pulse $P_H$ to have a polarity opposite to that of the pulse $P_H$ as shown in FIG. 2A.

The reason why the pulse $P_Y$ of positive polarity is inserted is to facilitate the synchronizing separation of this pulse $P_Y$ and to prevent a spurious periodic pattern from being produced in a low band component of the luminance signal Y by the pulse $P_Y$ thus avoiding a moiré.

Figure 2A:
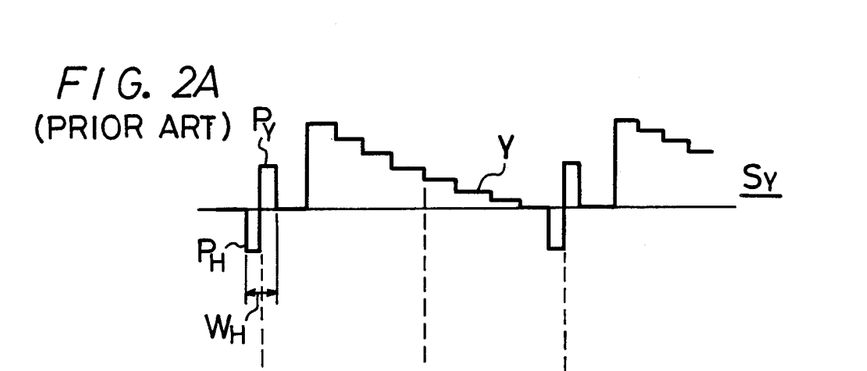
FIGS. 2A and 2B are respectively waveform diagrams useful for explaining the operation of the prior art recording apparatus of FIG. 1.
Figure 2B:
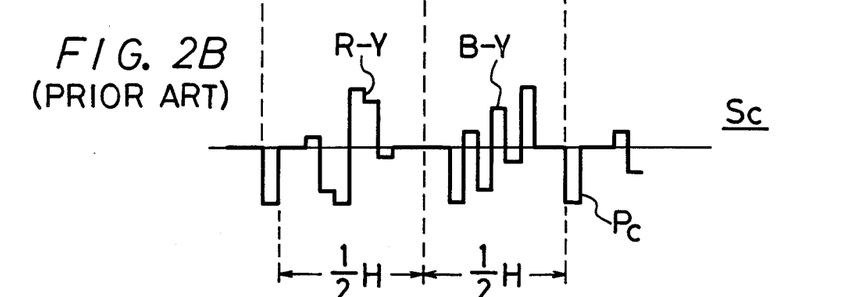

In FIG. 2A, $W_H$ represents the pulse width of the pulse $P_H$ and pulse $P_Y$ and in this example, the pulse width of the synchronizing pulse $P_Y$ is selected to be $\frac{1}{2}W_H$.

The luminance signal $S_Y$ added with the synchronizing pulse $P_Y$ is supplied to and frequency-modulated by a frequency modulator 3 and then recorded on a recording medium, for example, a tape 4 by a head Ha.

On the other hand, red and blue color difference signals $R-Y$ and $B-Y$ are supplied to a timebase compressor 40 in which their timebases are respectively compressed to $\frac{1}{2}$ and they are time division-multiplexed with each other to thereby form compressed color difference signals $(R-Y)'$ and $(B-Y)'$. The compressed color difference signals $(R-Y)'$ and $(B-Y)'$ are supplied to and added with a second synchronizing signal (pulse) $P_C$ in an adder 6, thus a compressed color difference signal $S_C$ shown in FIG. 2B being formed.

The second synchronizing pulse $P_C$ is inserted into the same position in time as the position at which the first synchronizing pulse $P_Y$ is inserted in order to match the timings between the channels. In this example, the second synchronizing pulse $P_C$ is inserted into the compressed color difference signals $(R-Y)'$ and $(B-Y)'$ so as to have a negative polarity.

The compressed color difference signal $S_C$ is supplied to and frequency-modulated by a frequency modulator 7 and then recorded on the tape 4 by a head Hb. In this case, the record track in which the compressed color difference signal is recorded is formed so as to become adjacent to the record track in which the luminance signal $S_Y$ is recorded.

In the recording apparatus 10 having a so-called E—E (electronic-editor) function to be able to confirm whether the compressed color difference signal $S_C$ or the like is normally recorded on the tape 4 or not, the compressed color difference signal $S_C$ must be expanded in timebase once so that a timebase expander that is same as the timebase compressor must be prepared.

However, this timebase expander is used only in the E—E mode, this timebase expander becomes wasteful and a peripheral circuit for driving the timebase expander is increased, thus enlarging the circuit scale considerably.

Further, when such E—E function is applied to a recording and reproducing apparatus having a playback function, the reproducing system thereof requires a similar timebase expander and hence similar defects can not be avoided.

OBJECTS AND SUMMARY OF THE INVENTION

Accordingly, it is an object of this invention to provide an apparatus for recording a color video signal in which even upon E—E(electronic-editor) mode, a timebase of a color video signal can be expanded without providing any special timebase expander.

It is another object of this invention to provide an apparatus for recording a color video signal which can miniaturize its circuit scale considerably.

It is a further object of this invention to provide an apparatus for recording a color video signal which is very suited to portable use.

According to one aspect of the present invention, there is provided an apparatus for recording a color video signal in which a luminance signal and a chrominance signal are recorded on separate channels and at least two chrominance component signals are compressed in timebase and alternately arranged in turn to be recorded on one track as said chrominance signal, said apparatus comprising:

timebase compressing and expanding means respectively provided for said chrominance component signals which carries out writing of said chrominance component signals by a first signal and reading thereof by a second signal with a frequency integer times as high as that of said first signal to thereby produce timebase compressed chrominance component signals; and coupling means for simultaneously coupling and supplying said chrominance component signals, which are being read out from an output of said timebase compressing and expanding means by said second signal, to an input of said timebase compressing and expanding means whereby said timebase compressed chrominance component signals are written in said timebase compressing and expanding means by said second signal,
wherein when succeeding chrominance component signals are written in said timebase compressing and expanding means by said first signal, said timebase compressed chrominance component signals rewritten in said timebase compressing and expanding means are read out therefrom by said first signal so as to produce normal chrominance component signals.

These and other objects, features and advantages of the present invention will become apparent from the following detailed description of the preferred embodiment taken in conjunction with the accompanying drawings, throughout which like reference numerals designate like elements and parts.

DESCRIPTION OF THE PREFERRED EMBODIMENT

Figure 4A:
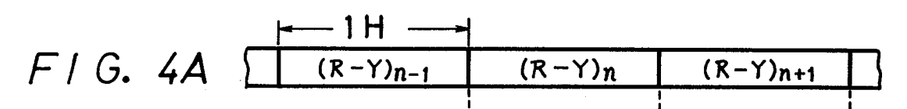
FIGS. 4A to 4O and FIGS. 5A to 5T are respectively diagrams useful for explaining the operation of the recording apparatus of this invention.
Figure 5A:
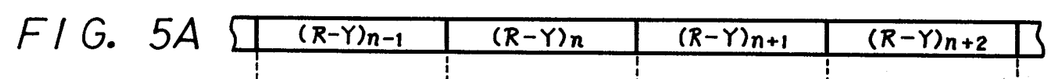
Figure 5B:
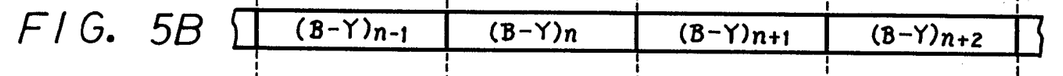
Figure 5C:
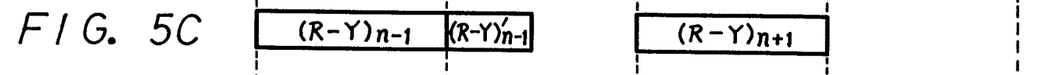
Figure 5D:
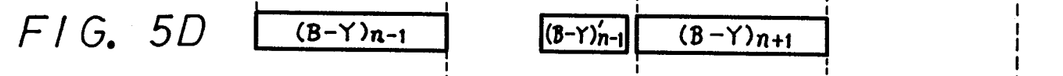
Figure 5E:
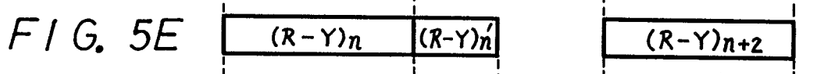
Figure 5F:
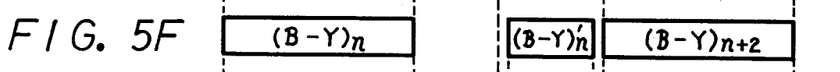

Now, an embodiment of a recording apparatus according to this invention will hereinafter be described in detail with reference to FIGS. 3 to 5, in which the present invention is applied to a recording and reproducing apparatus having a recording and reproducing function and an E—E function.

Figure 3:
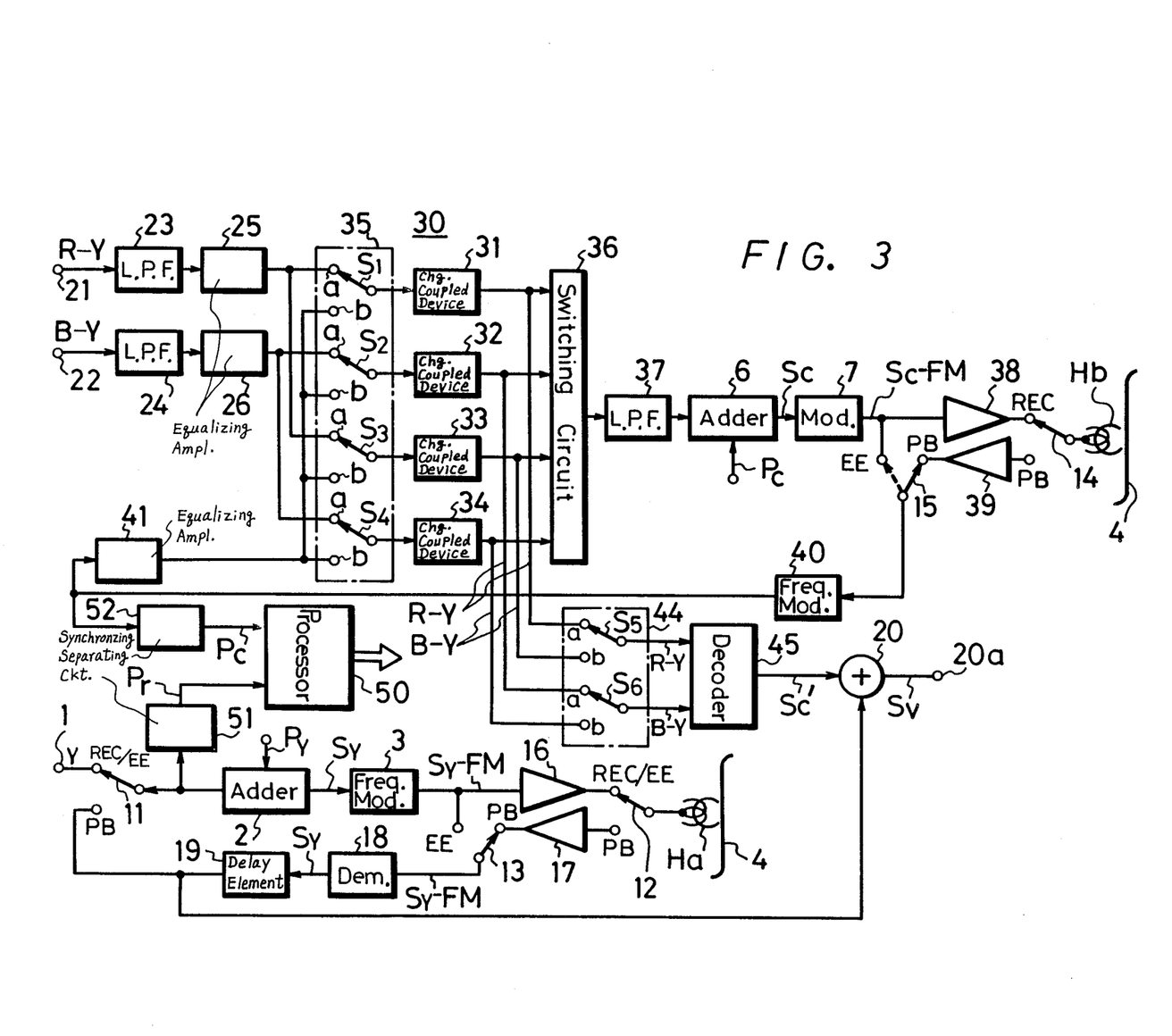
FIG. 3 is a block diagram schematically showing an embodiment of an apparatus for recording a color video signal according to the present invention.

FIG. 3 is a block diagram showing an embodiment of this invention. Referring to FIG. 3, a luminance signal Y applied to a terminal 1 is supplied through a first switching means 11 to an adder 2 in which it is added with a first synchronizing pulse $P_Y$ and then fed to a frequency modulator 3, thereby being frequency-modulated. The FM(frequency-modulated) luminance signal $S_Y$—FM from the frequency modulator 3 is supplied through a recording amplifier 16 and a second switching means 12 to a head Ha which records it on a tape 4.

An FM luminance signal $S_C$—FM reproduced by the head Ha is supplied through a recording amplifier 17 and a third switching means 13 to a demodulator 18 in which it is demodulated. The demodulated signal is then supplied through a delay element 19 having a delay time of 2 H(H is the horizontal period) to an adder 20 in which it is added with a chrominance sub-carrier signal $S_C'$, which was frequency-demodulated by a decoder as will be described later, and developed at a terminal 20a as a composite color video signal $S_V$.

The first to third switching means 11 to 13 are selectively changed in position dependent on a recording (REC) mode, a playback (PB) mode and E—E mode, respectively so that the luminance signal Y to be recorded and the reproduced luminance signal $S_Y$ are selected by the first and second switching means 11 and 12, while the reproduced FM luminance signal and a luminance signal to be recorded in E—E mode are selected by the third switching means 13. That is, upon E—E mode, the FM luminance signal $S_Y$—FM to be recorded on the tape 4 is not reproduced from the tape 4 but directly frequency-demodulated.

A pair of color difference signals R—Y and B—Y applied to terminals 21 and 22 are respectively supplied through low-pass filters 23 and 24 and equalizing amplifiers 25 and 26 to a timebase compressor and expander 30.

The timebase is compressed and expanded by using a plurality of charge transfer devices(CTDs), 4 CCDs(charge coupled devices) 31 to 34 in this embodiment. The CCDs 31 and 33 are used to compress and expand the timebase of the red color difference signal R—Y, while the CCDs 32 and 34 are used to compress and expand the timebase of the blue color difference signal B—Y. At the input stages of the CCDs 31 to 34, there is provided a first switching circuit 35 which selects the color difference signals R—Y and B—Y of which timebases are not yet compressed and a compressed color difference signal $S_C$ whose timebase was already compressed as will be described later.

The first switching circuit 35 is formed of 4 switches $S_1$ to $S_4$ which are prepared for the CCDs 31 to 34, respectively. In the playback mode or the exit mode a compressed color difference signal $S_C$ is commonly supplied to the contacts b of the switches $S_1$ and $S_4$, the red color difference signal R—Y is supplied to the contacts a of the first and third switches $S_1$ and $S_3$ and the blue color difference signal B—Y is supplied to the contacts a of the second and fourth switches $S_2$ and $S_4$.

The respective outputs of the CCDs 31 to 34 are supplied to a second switching circuit 36 in which a pair of color difference signals (R—Y)' and (B—Y)' with compressed timebases are time division-multiplexed on each other (FIG. 2B). The timebase compressed color difference signal $S_C$ is supplied through a low-pass filter 37 to an adder 6 in which it is added with a second synchronizing pulse $P_C$ and then frequency-modulated by a modulator 7. The FM compressed color difference signal $S_C$—FM is supplied through a recording amplifier 38 and a fourth switching means 14 to a head Hb by which it is recorded on the tape 4.

Since the signal recorded on the tape 4 is compressed in timebase, upon reproducing, the compressed timebase must be expanded. However, in this embodiment, in order to make the circuit scale small in size , the timebase compressor 30 used in the recording mode is used also as the timebase expander. To this end, the reproduced FM compressed color difference signal $S_C$—FM is supplied through a playback amplifier 39 and a fifth switching means 15 to a frequency demodulator 40 in which it is frequency-demodulated. The frequency demodulated compressed color difference signal $S_C$ is supplied through an equalizing amplifier 41 to the timebase compressor and expander 30. The timebase expanding operation in this case will be described later.

The pair of color difference signals R—Y and B—Y of which the timebases are expanded by the CCDs 31 to 34 are supplied to a third switching circuit 44 in which they are time division-multiplexed on each other. To this end, the third switching circuit 44 is formed of fifth and sixth switches $S_5$ and $S_6$, in which the outputs of the first and third CCDs 31 and 33 are respectively supplied to the fifth switch $S_5$, while the outputs of the second and fourth CCDs 32 and 34 are respectively supplied to the sixth switch S$_6$. The pair of the multiplexed color difference signals R−Y and B−Y therefrom are respectively supplied to a decoder 45 in which they are decoded to a chrominance carrier signal S$_C'$ and then fed to the adder 20.

Reference numeral 50 designates a system control processor. When a first synchronizing pulse P$_T$ which is separated by a first synchronizing separating circuit 51 is supplied to the processor 50, it generates write and read clocks CK$_W$ and CK$_R$ for the recording mode and the E—E mode and also generates a read clock CK$_R$ for the playback mode. Further, when supplied with a second synchronizing pulse P$_C$ separated by a second synchronizing separating circuit 52, the processor 50 generates a write clock CK$_W$ for the playback mode. Besides these clocks, the processor 50 produces control pulses and the like which control the plurality of switching means and the switching circuits.

The above-described fifth switching means 15 is used to selectively change-over the signals upon playback mode and E—E mode.

In the recording apparatus thus arranged, the timebase compressing and expanding operations thereof will be described with reference to FIGS. 4 and 5.

Figures 4B, 4C, 4D:
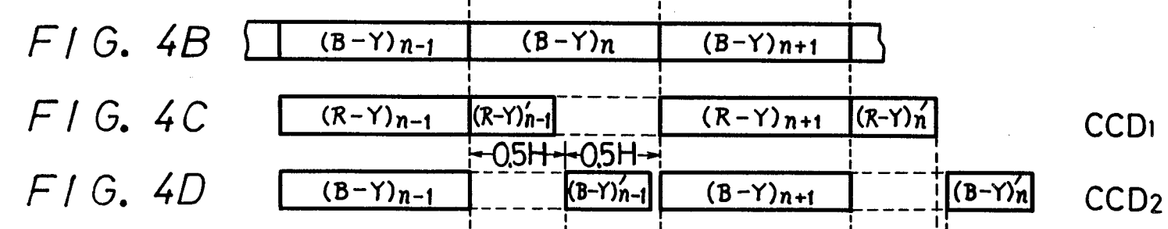
Figure 4E:
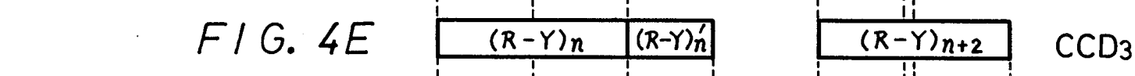
Figure 4F:
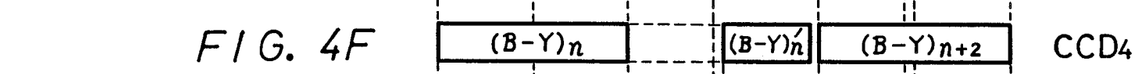

When the pair of color difference signals R−Y and B−Y with the time series shown in FIGS. 4A and 4B are input, at even line, the CCDs 31 and 32 are set in the write mode so that the pair of color difference signals R−Y and B−Y are respectively written on the basis of predetermined clocks CK$_W$ (shown in FIGS. 4L and 4M), while at odd line, the pair of color difference signals R−Y and B−Y are read out on the basis of the read clock CK$_R$ of which the frequency is selected to be twice the frequency of the write clock CK$_W$. Thus, the pair of color difference signals R−Y and B−Y are read out to have their timebases compressed to be ½ the original ones (FIGS. 4C and 4D). In this case, during the period of 0.5 H in the first half of the odd line, the read clock CK$_R$ is supplied only to the CCD 31, while during the period of 0.5 H of the second half thereof, the read clock CK$_R$ is supplied only to the CCD 32 so that the pair of color difference signals R−Y and B−Y are compressed in timebase in a time division manner.

When the CCDs 31 and 32 are in the read mode, the remaining CCDs 33 and 34 are placed in the write mode so that the pair of color difference signals R−Y and B−Y on the odd line are written in the CCDs 33 and 34, while at next line, the pair of color difference signals R−Y and B−Y thus written are compressed in timebase in a time division manner (shown in FIGS. 4E, 4F, 4N and 4O).

Figure 4G:
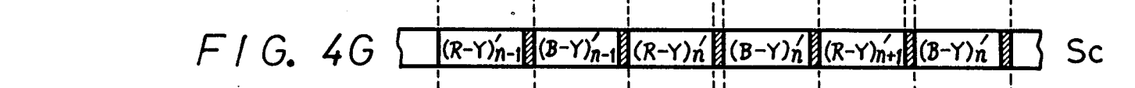

The pair of color difference signals (R−Y)' and (B−Y)' with the timebases compressed by the CCDs 31 to 34 are re-arranged to a signal of time series shown in FIG. 4G by the second switching circuit 36 to thereby form the compressed color difference signal S$_C$.

Figure 4H:
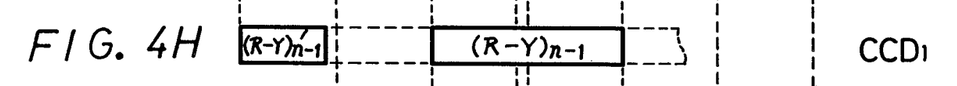
Figure 4I:
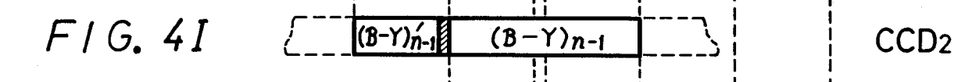

Upon reproducing, the first switching circuit 35 is changed in position to the contact b so that at odd line, the compressed color difference signal S$_C$, i.e., the timebase compressed color difference signals (R−Y)' and (B−Y)' are written in the CCDs 31 and 32 in a time division manner under the state that their timebases are compressed. Accordingly, as the write clock reproducing, there is used the read clock CK$_R$ upon recording. During the next one horizontal line period, the compressed color difference signals are read out therefrom under the condition that the timebases thereof are expanded twice (FIGS. 4H and 4I). Accordingly, as the read clock upon reproducing, there is used the write clock CK$_W$ upon recording.

Figure 4J:
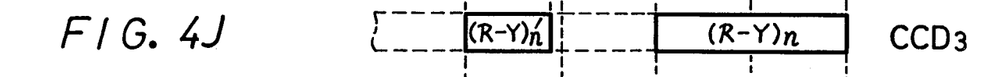
Figure 4K:
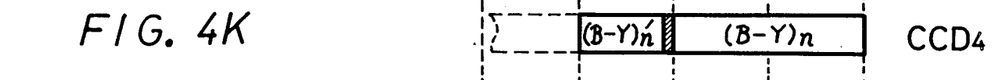
Figure 4L:
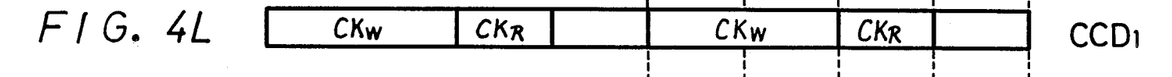
Figure 4M:
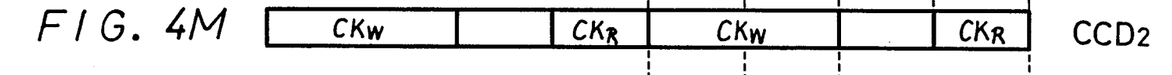
Figure 4N:
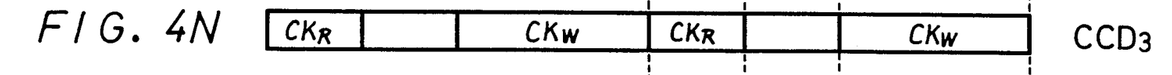
Figure 4O:
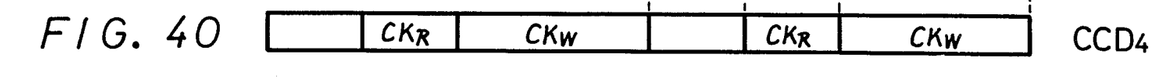

At even line, the CCDs 33 and 34 are set in the write mode, while at odd line, they are set in the read mode so that a pair of color difference signals R−Y and B−Y of which the timebases are expanded are read out from these CCDs 33 and 34 (FIGS. 4J and 4K). The pair of color difference signals R−Y and B−Y of which timebases are expanded by the CCDs 31 to 34 are time division-multiplexed with each other by the third switching circuit 44. In this case, since the red color difference signal R−Y is produced from the CCDs 31 and 33 and the blue color difference signal B−Y is produced from the CCDs 32 and 34, if the fifth and sixth switches S$_5$ and S$_6$ are alternately changed in position at every line period, the red color difference signal R−Y shown in FIG. 4A can be reproduced by the fifth switch S$_5$, while the blue color difference signal B−Y shown in FIG. 4B can be reproduced by the sixth switch S$_6$.

If the write clock and the read clock to be supplied to the timebase compressing CCDs 31 to 34 are properly selected as described above, the CCDs 31 to 34 can be used to expand the timebase, too.

Figure 5G:
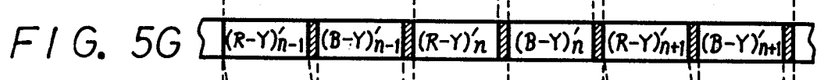
Figure 5H:
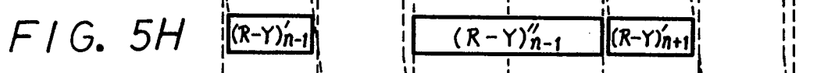
Figure 5I:
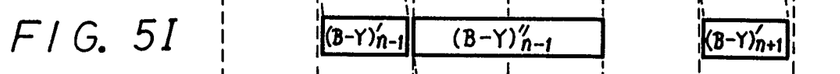
Figure 5J:
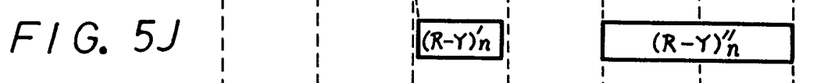
Figure 5K:
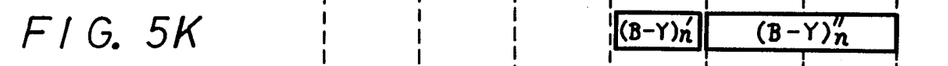
Figure 5L:
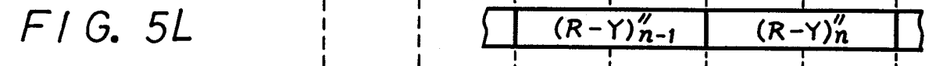
Figure 5M:
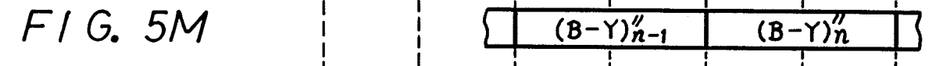
Figure 5N:
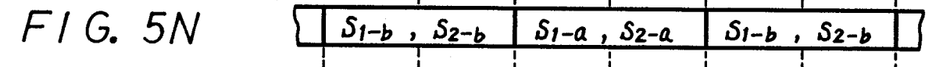
Figure 5O:
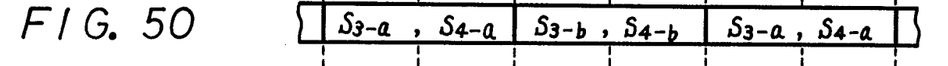
Figure 5P:
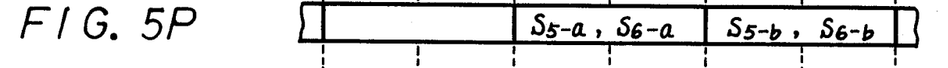

The CCDs 31 to 34 can be used as not merely the timebase expanding elements upon reproducing but also the timebase expanding elements upon E—E mode. FIGS. 5A to 5T are respectively diagrams useful for explaining the operation upon E—E mode.

In this case, only the color signal system will be described. Upon E—E mode, the fifth switching means 15 is changed in position as shown by a broken line in FIG. 3 and the first switching circuit 35 is so controlled that when the first and second switching circuits S$_1$ and S$_2$ thereof are changed in position to the contacts b, the third and fourth switches S$_3$ and S$_4$ thereof are changed in position to the contacts a. Thus the frequency-demodulated compressed color difference signal S$_C$ (FIG. 5G) is supplied to the CCDs 31 to 34. FIGS. 5A to 5F are the same as FIGS. 4A to 4F and they will not be described.

When at odd line the CCDs 31 and 32 are in the read mode (clock CK$_R$), the compressed color difference signals (R−Y)' and (B−Y)' read out from the CCDs 31 and 32 to have the delay time Δt of the transmission system are supplied to the first switching circuit 35. Accordingly, if the compressed color difference signals (R−Y)' and (B−Y)' are supplied to the CCDs 31 and 32, the pair of the color difference signals R−Y and B−Y which are written in the CCDs 31 and 32 just 1H before are read out therefrom with their timebases compressed and the color difference signals (R−Y)' and (B−Y)' thus read out are rewritten in the same CCDs 31 and 32 under the state that their timebases are compressed (FIGS. 5H and 5I).

Figure 5Q:
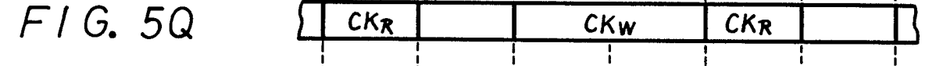
Figure 5R:
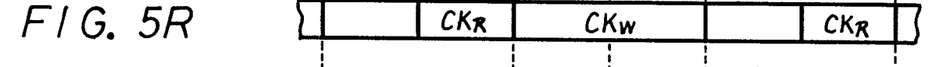
Figure 5S:
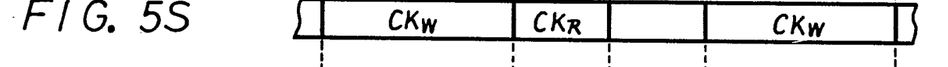
Figure 5T:
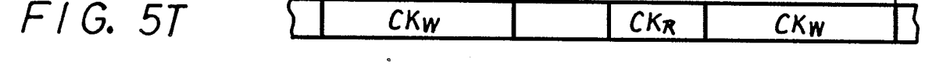

At even line, the first and second switches S$_1$ and S$_2$ are changed in position to the contacts a (FIG. 5N) to allow the pair of color difference signals R−Y and B−Y applied to the terminals 11 and 12 to be fed to the CCDs 31 and 32 in which they are written on the basis of the write clock CK$_W$ (FIGS. 5Q and 5R). At this time, since the compressed color difference signals (R−Y)' and (B−Y)' were already written just 1H before in the CCDs 31 and 32, the pair of color difference signals R−Y and B−Y are written therein and at the same time, the compressed color difference signals (R−Y)' and (B−Y)' are read out from these CCDs 31 and 32 under the state that their timebases are expanded twice. Accordingly, with respect to the CCDs 31 and 32, input/output relation, clock relation and switching relation of the first and second switches S₁ and S₂ become as shown in FIGS. 5H, 5I, 5N, 5Q and 5R, respectively.

The pair of color difference signals (R−Y)″ and (B−Y)″ read out once again are time division-multiplexed with each other (FIG. 5P) by the third switching circuit 44 to thereby form a pair of color difference signals (R−Y)″ and (B−Y)″ shown in FIGS. 5L and 5M. The pair of color difference signals (R−Y)″ and (B−Y)″ produced upon E—E mode are the same as the pair of present color difference signals R−Y and B−Y which are applied to the terminals 11 and 12. However, since the color difference signals (R−Y)″ and (B−Y)″ produced upon E—E mode are delayed by 2H from the pair of the present color difference signals R−Y and B−Y, in order to match the time relation between it and the luminance signal Y, the delay element 19 of delay time 2H is provided in the luminance signal system.

With respect to the CCDs 33 and 34, the similar re-writing and re-reading are executed, in which case, the re-writing timing and the re-reading timing thereof become opposite to those of the CCDs 31 and 32 (see FIGS. 5J, 5K, 5L, 5M, 5O, 5S, and 5T), respectively.

In consideration of the fact that the write operation and the read operation are carried out alternately at every horizontal period and that during the read operation, the supply of the present color difference signals R−Y and B−Y is prohibited, even when the same CCDs 31 to 34 are used, if the compressed color difference signal S_C is supplied during the read operation, the pair of color difference signals of which the timebases are expanded can be produced during the write operation which is the next cycle of the read operation.

While in the afore-mentioned embodiment the present invention is applied to the recording apparatus in which only the pair of color difference signals R−Y and B−Y are compressed in timebase to one half (½) and recorded on the track different from that of the luminance signal, this invention can be applied to a recording apparatus in which a pair of color difference signals are compressed in timebase to ¼ and the luminance signal is also compressed in timebase to one half (½) and they are time division-multiplexed with one another so as to be recorded on one track.

Further, the present invention can be applied to a recording apparatus which is rendered no playback function with the same action and effect being achieved.

As set forth above, according to the present invention, there is provided the recording apparatus in which the color video signal is recorded to have its timebase compressed, the timebase compressing element can be used as the timebase expanding element so that the timebase expander becomes unnecessary and also the peripheral circuit thereof becomes unnecessary, thus miniaturizing the circuit scale considerably.

In consequence, the recording apparatus of this invention is very suited to a portable recording apparatus and so on.

The above description is given on a single preferred embodiment of the invention, but it will be apparent that many modifications and variations could be effected by one skilled in the art without departing from the spirit or scope of the novel concepts of the invention, so that the scope of the invention should be determined by the appended claims only.

We claim as our invention:

1. A video tape recorder of the kind that records a color video signal in which a luminance signal and a chrominance signal are recorded on separate channels in combination with a timebase circuit wherein at least two chrominance component signals are compressed in timebase and alternately arranged in turn to be recorded on one track as said chrominance signal, for monitoring in an edit mode a compressed chrominance signal prior to recording the latter comprising:

a control signal processor receiving said color video signal and producing video display control signals therefrom;

the timebase circuit including timebase compressing and expanding means having first and second inputs receiving at said first inputs said chrominance component signals and control signals from said control signal processor for inputting therein to said chrominance component signals in response to a first control signal from said control signal processor and for outputting said chrominance component signals in response to a second control signal from said control signal processor with a frequency that is an integral number of times higher than that of said first control signal to thereby produce in a recording mode timebase compressed chrominance component signals; and coupling means for use in the edit mode for supplying said chrominance component signals, which are derived from an output of said timebase compressing and expanding means under control of said second control signal, to said second inputs of said timebase compressing and expanding means whereby said timebase compressed chrominance component signals are input in said timebase compressing and expanding means by said second control signal, wherein when succeeding chrominance component signals are input into said timebase compressing and expanding means at said second inputs by said second control signal, said timebase compressed chrominance component signals that are re-input in said timebase compressing and expanding means are output therefrom by said first control signal so as to produce normal timebase chrominance component signals for monitoring in the edit mode.

2. A color video tape recording having a recording mode, in which a luminance signal and a chrominance signal are recorded on separate channels in with combination a timebase circuit wherein at least two chrominance component signals are compressed in timebase and arranged in turn to be recorded on one track as said chrominance signal, for monitoring a compressed chrominance signal in an edit mode comprising:

clock signal generating means for producing a first clock signal and a second clock signal having a frequency an integral number of times higher than said first clock signal;

the timebase circuit including timebase compressing and expanding means connected to receive said chrominance component signals and said first and second clock signals for producing timebase compressed chrominance component signals by carrying out clocking in of said chrominance component signals into said timebase compressing and expanding means by said first clock signal and clocking said chrominance component signals out of said timebase compressing and expanding means by said second clock signal; and first switching means having an output terminal connected to an input terminal of said timebase compressing and expanding means, a first input switch terminal supplied with said chrominance component signals and a second switch input terminal supplied with said timebase compressed chrominance component signals from said timebase compressing and expanding means, wherein when said chrominance component signals are fed to said first input switch terminal and said switching means operates to connect said first switch input terminal to said output terminal, said chrominance component signals are clocked into said timebase compressing and expanding means by said first clock signal and clocked out thereof by said second clock signal to form compressed chrominance component signals, while when said compressed chrominance component signals are fed to said second input switch terminal and said switching means operates to connect said second input terminal to said output terminal said compressed chrominance component signals are clocked in said timebase compressing and expanding means by said second clock signal, said timebase compressed chrominance component signals are clocked out therefrom by said first clock signal, whereby their timebases are expanded to a normal timebase for monitoring in an edit mode.

3. The apparatus for recording a color video signal as claimed in claim 2, in which said timebase compressing and expanding means is formed of a plurality of storage elements.

4. A video tape recorder that at least records a color video signal such that luminance signal and a chrominance signal are recorded on separate channels in combination with a timebase circuit in whcih first and second chrominance component signals are compressed in timebase and alternately arranged in turn to be recorded on one track as said chrominance signal, for monitoring a compressed chrominance signal in an edit mode comprising:

clock signal generating means for producing a first clock signal and a second clock signal with a frequency twice the frequency of said first clock signal;

first and second storage elements responsive to said first and second clock signals for compressing in timebase said first chrominance component signal;

third and fourth storage elements responsive to said first and second clock signals for compressing in timebase said second chrominance component signal, said first to fourth storage elements receiving therein said first and second chrominance component signals at a first rate in response to said first clock signal and outputting said first and second chrominance component signals therefrom at a second rate in response to said second clock signal at every 1H periods, said first and second storage elements forming a first pair and said third and fourth storage elements forming a second pair, said first and second pairs being controlled by said first and second clock signals for alternately carrying out receiving and outputting of said chrominance component signals so as to sequentially produce timebase compressed chrominance component signals at output terminals of said first to fourth storage elements;

second switching means connected to the output terminals of said first to fourth storage elements and producing successive timebase compressed chrominance component signals at output terminals thereof; and first switching means having four switches each having respective first and second input terminals, the output terminals of said four switches are respectively connected to input terminals of said first to fourth storage elements, said first input terminals of said four switches of said first switching means being supplied with said first and second chrominance component signals and said second input terminals of said four switches of said first switching means being supplied with successive timebase compressed chrominance component signals from output terminals of said second switching means, in which when said storage elements are driven by said first clock signal, said first input terminals and output terminals of said first switching means are connected to one another so as to input said chrominance component signals in said storage elements, and when said storage elements are driven by said second clock signal, said second input terminals and output terminals of said first switching means are connected to one another so as to again re-input said timebase compressed chrominance component signals back into said storage elements, whereby when said storage elements are driven by said first clock signals for inputting said timebase compressed chrominance component signals, said re-inputted timebase compressed chrominance component signals are expanded in timebase and outputted from said storage elements in a normal timebase for monitoring in an edit mode.

5. The apparatus for use with a color video tape recorder as claimed in claim 4, wherein said first and second chrominance component signals are outputted from said storage elements by said second clock signal having the frequency twice the frequency of said first clock signal used for inputting said first and second chrominance component signals in said storage elements and wherein an input mode for said first chrominance component signal is set in the first half of one horizontal period and an output mode for said second chrominance component signal is set in the second half of said one horizontal period to thereby alternately obtain said first and second chrominance component signals the timebase of which are compressed by half.

* * * * *